(12) United States Patent
Keating et al.

(10) Patent No.: US 12,294,969 B2
(45) Date of Patent: May 6, 2025

(54) BEAM SELECTION DURING DOWNLINK POSITIONING

(71) Applicant: Nokia Technologies Oy, Espoo (FI)

(72) Inventors: Ryan Keating, Chicago, IL (US); Tao Tao, Shanghai (CN); Daejung Yoon, Massy (FR); Stephan Saur, Stuttgart (DE); Wolfgang Zirwas, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 583 days.

(21) Appl. No.: 17/637,660

(22) PCT Filed: Aug. 26, 2019

(86) PCT No.: PCT/CN2019/102597
§ 371 (c)(1),
(2) Date: Feb. 23, 2022

(87) PCT Pub. No.: WO2021/035484
PCT Pub. Date: Mar. 4, 2021

(65) Prior Publication Data
US 2022/0322274 A1   Oct. 6, 2022

(51) Int. Cl.
*H04W 64/00*   (2009.01)
(52) U.S. Cl.
CPC .................................. *H04W 64/00* (2013.01)
(58) Field of Classification Search
CPC ..... H04W 64/00; H04W 24/10; H04W 72/23; H04W 92/18; H04W 72/0446; H04W 72/1268; H04W 24/02; H04W 4/029; H04W 4/02; H04W 16/28
See application file for complete search history.

(56) References Cited

U.S. PATENT DOCUMENTS

| | | | |
|---|---|---|---|
| 2019/0132778 A1 | 5/2019 | Park et al. | |
| 2019/0302220 A1* | 10/2019 | Kumar | H04W 4/44 |
| 2022/0236404 A1* | 7/2022 | Gunnarsson | G01S 13/765 |

FOREIGN PATENT DOCUMENTS

| | | |
|---|---|---|
| CN | 106851675 A | 6/2017 |
| CN | 110036674 A | 7/2019 |
| WO | WO-2018204863 A1 | 11/2018 |
| WO | WO 2019/027680 A2 | 2/2019 |

OTHER PUBLICATIONS

Huawei, HiSilicon "Physical Layer Procedure for NR Positioning" 3GPP TSG RAN WG1 #97 Reno, USA, May 13-17, 2019. R1-1906055.

(Continued)

*Primary Examiner* — Kwasi Karikari
(74) *Attorney, Agent, or Firm* — Lippes Mathias LLP

(57) ABSTRACT

Embodiments of the present disclosure relate to beam selection during downlink positioning. According to embodiments of the present disclosure, the terminal devices are grouped based on their characteristics and the anchor terminal device in the group determines the best transmitting beam of the neighbor network device. The non-anchor terminal device uses the assistance information of the best transmitting beam determined by the anchor terminal device. In this way, cost for the terminal device to receive and measure the PRS during downlink positioning has been reduced.

10 Claims, 10 Drawing Sheets

(56) References Cited

OTHER PUBLICATIONS

3GPP TSG RAN WG1 #96bis, Xi'an, China, Apr. 8-12, 2019, R1-1904108, "Discussion on UE and gNB measurments for NR positioning", vivo, 4 pgs.
3GP TSG-RAN WG2 #104, Spokane, USA, Nov. 12-16, 2018, R2-1816550, "Support beam sweeping OTDOA", ZTE, 4 pgs.
3GPP TSG-RAN WG2 Meeting #106, Reno, US, May 13-17, 2019, R2-1907766, "Beam management for downlink positioning", Huawei, HiSilicon, 4 pgs.

* cited by examiner

BEAM SELECTION DURING DOWNLINK POSITIONING

CROSS REFERENCE TO RELATED APPLICATION

This patent application is a U.S. National Stage application of International Patent Application Number PCT/CN2019/102597 filed Aug. 26, 2019 which is hereby incorporated by reference in its entirety.

FIELD

Embodiments of the present disclosure generally relate to the field of communications, in particular, to a method, device, apparatus and computer readable storage medium for beam selection during downlink positioning.

BACKGROUND

Recently, several technologies have been proposed to improve communication performances. In new radio (NR) at mmWave (commonly called FR2) support for beamforming on both the base station side and the terminal device side may be introduced. This complicates the reception of the positioning reference signal (PRS) as in long term evolution (LTE) the signal was normally sent with a wide beam covering a large area and received by an omnidirectional UE antenna. With beamforming, the terminal device needs to determine which receiving beams to use for receiving and measuring the PRS from different network devices. The terminal device may also wish to minimize the number of transmitting beams of the PRS that it tries to measure.

SUMMARY

In general, example embodiments of the present disclosure provide a solution for beam selection during downlink positioning and corresponding communication devices.

In a first aspect, there is provided a location management device. The device comprises at least one processor; and at least one memory including computer program codes; the at least one memory and the computer program codes are configured to, with the at least one processor, cause the device to transmit, to a serving network device, a request to determine an identity of a group of terminal devices, the terminal device belonging to the group of terminal devices. The first device is yet caused to receive, from an anchor terminal device in the group, assistance information indicating one or more target transmitting beams of a neighbor network device, the assistance information being associated with the group of terminal devices. The device is also caused to receive an identity of the group of terminal devices from the serving network device.

In a second aspect, there is provided a network device. The network device comprises at least one processor; and at least one memory including computer program codes; the at least one memory and the computer program codes are configured to, with the at least one processor, cause the network device to receive from a location management device a request to determine a group of terminal devices to which a terminal device belongs. The network device is further caused to determine the group of terminal device based on a network characteristic of the terminal device so that one or more target transmitting beams of a neighbor network device is shared among the group of terminal devices. The network device is also caused to transmit an identity of the group of terminal devices to the location management device.

In a third aspect, there is provided a terminal device. The third device comprises at least one processor; and at least one memory including computer program codes; the at least one memory and the computer program codes are configured to, with the at least one processor, cause the terminal device to obtain assistance information indicating one or more target transmitting beams towards a neighbor network device, the assistance information being associated with a group of terminal devices to which the terminal device belongs, the group of terminal devices determined in response to the request for downlink positioning. The terminal device is further caused to determine, based on the information, the one or more target transmitting beams to facilitate the downlink positioning.

In a fourth aspect, there is provided a method. The method comprises transmitting, to a serving network device, a second request to determine an identity of a group of terminal devices, the terminal device belonging to the group of terminal devices. The method also comprises receiving, from an anchor terminal device in the group, assistance information indicating one or more target transmitting beams of a neighbor network device, the assistance information being associated with the group of terminal devices. The method further comprises receiving an identity of the group of terminal devices from the serving network device.

In a fifth aspect, there is provided a method. The method comprises receiving, at a serving network device and from a location management device, a request to determine a group of terminal devices to which a terminal device belongs. The method also comprises determining the group of terminal device based on a network characteristic of the terminal device so that one or more target transmitting beams of a neighbor network device is shared among the group of terminal devices. The method further comprises transmitting an identity of the group of terminal devices to the location management device.

In a sixth aspect, there is provided a method. The method comprises obtaining assistance information indicating one or more target transmitting beams of a neighbor network device, the assistance information being associated with a group of terminal devices to which the terminal device belongs, the group of terminal devices determined in response to the request for downlink positioning. The method also comprises determining, based on the information, the one or more target transmitting beams to facilitate the downlink positioning In a seventh aspect, there is provided an apparatus. The apparatus comprises means for transmitting, to a serving network device, a request to determine an identity of a group of terminal devices, the terminal device belonging to the group of terminal devices; means for receiving, from an anchor terminal device in the group, assistance information indicating one or more target transmitting beams towards a neighbor network device, the assistance information being associated with the group of terminal devices; and means for receiving an identity of the group of terminal devices from the serving network device.

In an eighth aspect, there is provided an apparatus. The apparatus comprises means for to receiving, at a serving network device and from a location management device, a request to determine a group of terminal devices to which a terminal device belongs; means for determining the group of terminal device based on a network characteristic of the terminal device so that one or more target transmitting beams of a neighbor network device is shared among the group of terminal devices; and means for transmitting an identity of the group of terminal devices to the location management device.

In a ninth aspect, there is provided an apparatus. The apparatus comprises means for obtaining assistance information concerning one or more target transmitting beams towards a neighbor network device, the assistance information being associated with a group of terminal device to which the terminal device belongs, the group of terminal devices determined in response to the request for downlink positioning; and means for determining, based on the information, the one or more target transmitting beams to facilitate the downlink positioning.

In a tenth aspect, there is provided a non-transitory computer readable medium comprising program instructions for causing an apparatus to perform at least the method according to any one of the above fourth to sixth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
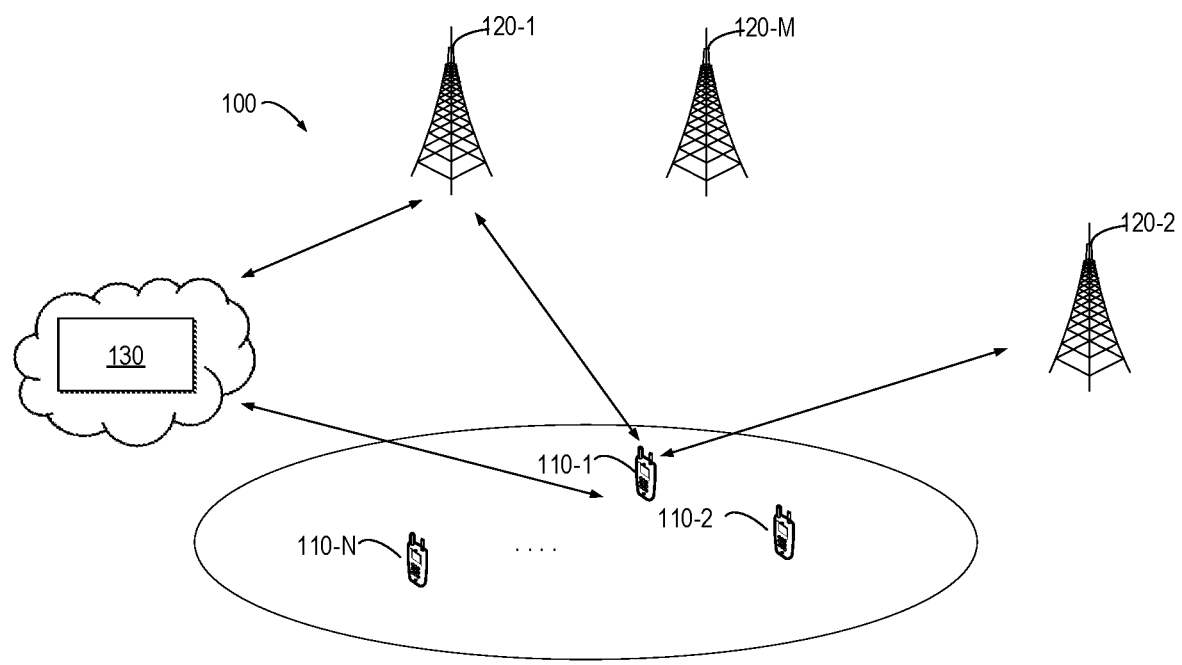
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR), Non-terrestrial network (NTN) and so on. Furthermore, the communications between a terminal device and a network device in the communication network may be performed according to any suitable generation communication protocols, including, but not limited to, the first generation (1G), the second generation (2G), 2.5G, 2.95G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, with beamforming, the terminal device needs to determine which receiving beams to use for receiving and measuring the PRS from different network devices. The terminal device may also wish to minimize the number of transmitting beams of the PRS that it tries to measure. In NR the PRS may also be referred to as DL PRS. It is also possible that positioning could be done using additional reference signals in NR such as CSI-RS for tracking and the invention should be understood to also cover the case of using those reference signals for positioning. During the Rel-16 work in $3^{rd}$ generation partner project (3GPP), there has been discussion of how to deal with this problem and one of the main solutions has been to include Quasi-colocation (QCL) information to neighbour cells. The major issue with this approach is that the terminal device may not be able to obtain QCL information to every cell which it tries to measure the PRS on. This is due to the fact that the number of cells which are measured for downlink time difference of arrival (DL-TDOA) is much higher than the number of cells that the terminal device is normally measuring on for mobility measurements. This means the terminal device either needs additional configurations prior to PRS measurement which increase cost at the terminal device side or the terminal device will not have sufficient QCL information for all the cells.

The other option is for the terminal device to just perform receiving beam sweeping and to measure all the PRS beams from the neighbor cells. This option may incur a high cost at both the network and the terminal device side. For example, if the terminal device has even 4 receiving beams and there are 8 PRS transmitting beams this requires 32 PRS transmissions per network device. The number of beams could even be much higher than this example as well. Thus, it is worth discussing on how to optimize the choice of PRS transmitting beams that the terminal device decides to measure as well as which receiving beams to use if certain criteria are met.

According to embodiments of the present disclosure, the terminal devices are grouped based on their characteristics and the anchor terminal device in the group determines the best transmitting beam(s) of the neighbor network device. The non-anchor terminal device uses the assistance information of the best transmitting beam(s) determined by the anchor terminal device. In this way, cost for the terminal device to receive and measure the PRS during downlink positioning has been reduced.

Principle and embodiments of the present disclosure will be described in detail below with reference to the accompanying drawings. Reference is first made to FIG. 1, which illustrates an example communication system 100 in which embodiments of the present disclosure may be implemented.

FIG. 1 illustrates a schematic diagram of a communication system 100 in which embodiments of the present disclosure can be implemented. The link from the second device 120 to the first devices 110 may be referred to as the "downlink" and the link from the first devices 110 to the second device 120 may be referred to as the "uplink". The procedures which are described to be implemented at the terminal device may also be able to be implemented at the network device and the procedures which are described to be implemented at the network device may also be able to be implemented at the terminal device.

The communication system 100, which is a part of a communication network, comprises terminal devices 110-1, 110-2, . . . , 110-N (collectively referred to as "terminal device(s) 110" where N is an integer number). The communication system 100 comprises network devices 120-1, 120-2, . . . , 120-M (collectively referred to as "network device(s) 120" where M is an integer number). The system 100 may also comprise a location management device 130 on which the location management function (LMF) is implemented. The location management device 130 may be implemented in the core network. Alternatively or in addition, the location management device 130 may also be in a radio access network. It should be noted that embodiments of the present disclosure are not limited in this aspect.

It should be understood that the communication system 100 may also comprise other elements which are omitted for the purpose of clarity. It is to be understood that the numbers of terminal devices and network devices shown in FIG. 1 are given for the purpose of illustration without suggesting any limitations. The terminal devices 110, the network device 120 and the network devices 130 may communicate with each other.

It is to be understood that the number of network devices and terminal devices is only for the purpose of illustration without suggesting any limitations. The system 100 may include any suitable number of network devices and terminal devices adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
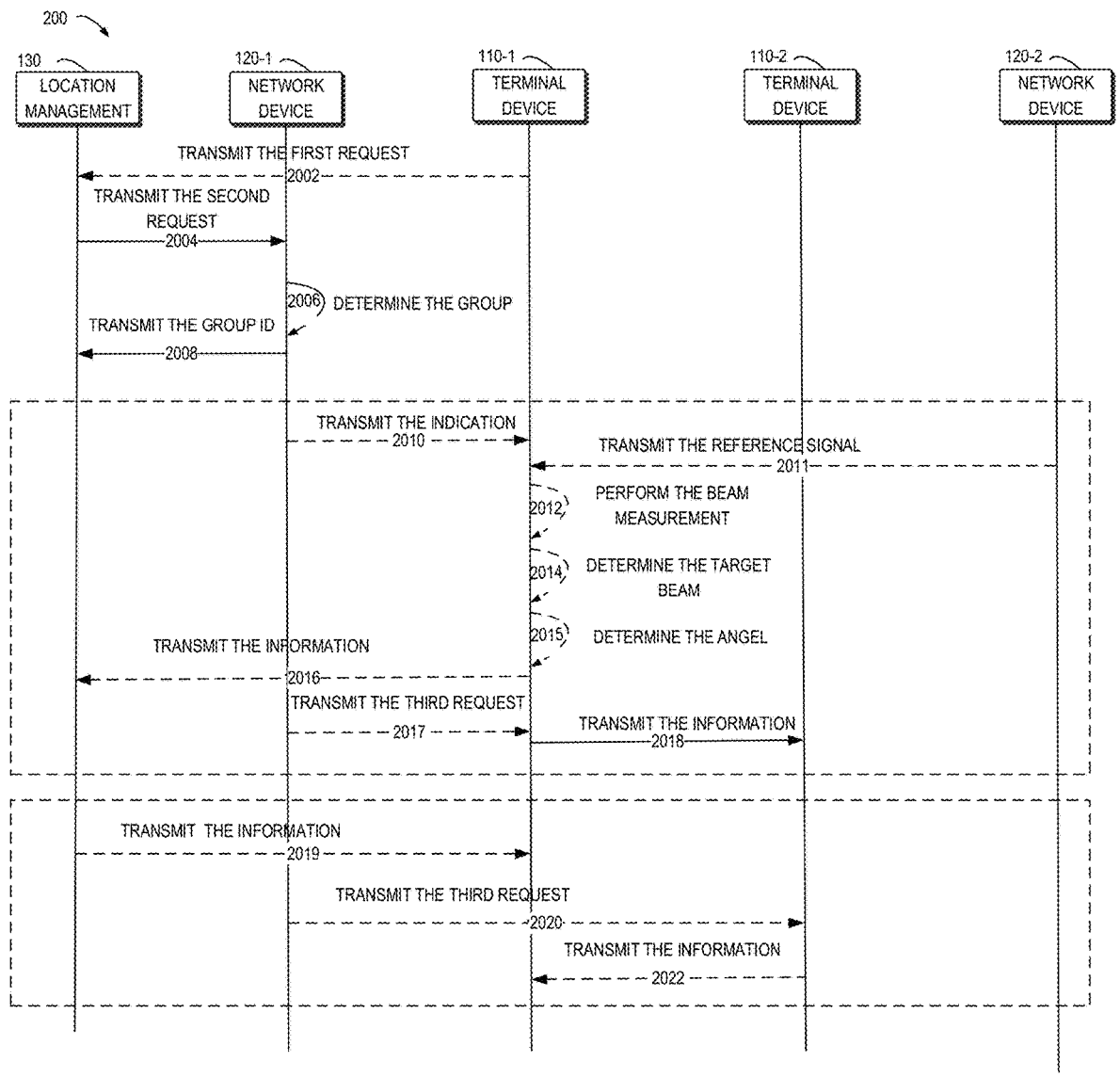
FIG. 2 illustrates a schematic diagram of interactions among communication devices according to embodiments of the present disclosure.

FIG. 2 illustrates a schematic diagram of interactions 200 in accordance with embodiments of the present disclosure. The interactions 200 may be implemented at any suitable devices. Only for the purpose of illustrations, the interactions 200 are described to be implemented at the terminal device 110-1, the network device 120-1, the network device 120-2 and the location management device 130. For the purpose of illustrations, the network device 120-1 may currently serves the terminal devices 110-1 and 110-2 and the network device 120-2 may be a neighbor network device.

In some embodiments, the terminal device 120-1 may transmit 2002 a request (referred to as "the first request" hereinafter) for downlink positioning to the location management device 130. For example, the terminal device 120-1 may set up a LTE positioning protocol (LPP) secession with the location management device 130. It should be noted that the first request may also be transmitted from other devices. It should be noted that the any protocols for "NR-PP" are also applicable.

The location management device 130 transmits 2004 a request (referred to as "the second request" hereinafter) to the serving network device 120-1 to trigger determining a group of terminal devices to which the terminal device 110-1 belongs. The network device 120-1 determines 2006 an identity of the group of terminal devices based on the characteristics of the terminal device 110-1. Moreover, terminal devices with the same, common, or similar characteristics may be assigned with the same group identity. The network device 120-1 may assign an identity to the group of terminal devices.

In an example embodiment, the characteristics for grouping may comprise one or more of: a synchronization signal block (SSB) or a channel state information reference signal CSI-RS index of the serving cell, SSB/CSI-RS index of the serving network device 120-1, timing advance (TA) of the terminal device 110-1, a reference signal received power report derived from a reference signal from at least one of the serving network device or other network devices (for example, a L3-RSRP report), the angle of departure at the serving cell and the angle of arrival at the serving network device 120-1, active sidelink connections of the terminal device 110-1, sensor information of the terminal device 110-1 (for example, speed, direction), or connectivity of the terminal device 110-1 to a small cell or WiFi hotspot. According to one example embodiment, the terminal device groups and group identity may be determined based on one or a combination of these characteristics. In another example embodiment, the groups may be determined based on SSB/CSI-RS index and TA.

In some embodiments, if the serving network device 120-1 determines that the terminal device 110-1 does not belong to any existing groups based on its characteristics, the serving network device 120-1 may determine that the terminal device 110-1 to be the anchor terminal device of a new group. In other embodiments, if the serving network device 120-1 determines that the terminal device 110-1 belongs to an existing group based on its characteristics, the serving network device 120-1 may determine that the terminal device 110-1 to be the non-anchor terminal device in the group. Alternatively, even if the terminal device 110-1 belongs to an existing group, the serving network device 120-1 may also determine the terminal device 110-1 to be the anchor terminal device in the existing group.

In an example embodiment, the anchor terminal device may be determined randomly. In some embodiments, some of the terminal device receiving beams may be blocked by a hand or a nearby person. The serving network device 120-1 may transmit other information to indicate the anchor terminal device to the location management device 130. The location management device 130 may have the blockage information regarding which terminal device is blocked. If the anchor terminal device is blocked, the location management device 130 may inform the serving network device 120-1 that the current anchor terminal device is not proper based on the sensor data known only at the location management device 130. In this case, the location management device 130 may request the serving network device 120-1 to select a new anchor terminal device.

In addition, if there is no terminal device without significant blockage into certain directions, the location management device 130 may generate a 'virtual' anchor terminal device, comprising two or more real world terminal devices. Especially the location management device 130 may combine the reported relevant beams (plus their relative angles)—for all terminal devices being part of the virtual terminal device—including the angle dependent blockage per terminal device with the goal to cover the whole 360 degree space as far as possible.

The serving network device 120-1 transmits 2008 the identity of the group of terminal devices to the location management device 130. The serving network device 120-1 may also transmit the identity information of the anchor terminal device to the location management device 130.

As mentioned above, the terminal device 110-1 may be the anchor terminal device in the group of terminal devices. In this situation, the serving network device 120-1 may transmit 2010 an indication to explicit indicate that the terminal device 110-1 is the anchor terminal device. Alternatively, the serving network device 120-1 may transmit 2010 an indication to the terminal device 110-1 to perform the beam measurement, which implicitly indicates the terminal device 110-1 is the anchor terminal device. In other embodiments, if the terminal device 110-1 is the anchor terminal device, the location server management device 130 may transmit an indication to the terminal device 110-1 to perform the measurement.

The neighboring network device 120-2 may transmit 2011 reference signals to the terminal device 110-1. The terminal device 110-1 may perform 2012 the measurement on the transmitting beams from the neighbor network devices 120-2. For example, the measurement may be a reference signal time difference, RSTD, measurement. Alternatively or in addition, the measurement may also be a reference signal received power (RSRP) measurement. This may involve being configured to measure the PRS from either all the beams from neighboring network devices 120-2, or a reasonable sub-set of transmitting beams from neighbor network devices 120-2 depending on the geometric relation. Only those transmitting beams from neighbor network devices 120-2 need to measure which point roughly in the direction of the serving network devices 120-1. With increasing distance to the serving cell, this sub-set may become smaller in most cases. Reasonable sub-sets of transmitting beams to be measured by the anchor terminal device 110-1 may be stored in a look-up table at the location management device 130 and provided as part of the assistance data of the LPP. Alternatively or in addition, this may involve being configured to measure other RS from neighboring network device 120-2 such as CSI-RS or SSB and using the best beams for those RS as the basis for determining the best PRS beams.

In the situation where the terminal device 110-1 is the anchor terminal device, the terminal device 110-1 may determine 2014 the one or more target transmitting beams based on the measurement result. The one or more target transmitting beams may also refer to the best transmitting beam. The "best" beam here refers to the beam which will result in the highest accuracy RSTD measurement, which typically relates to the time-of-arrival of the first signal component/line-of-sight path. In the simplest case this may be the beam with the highest RSRP value if the terminal device does not know which beam will have the highest RSTD accuracy.

Figure 3:
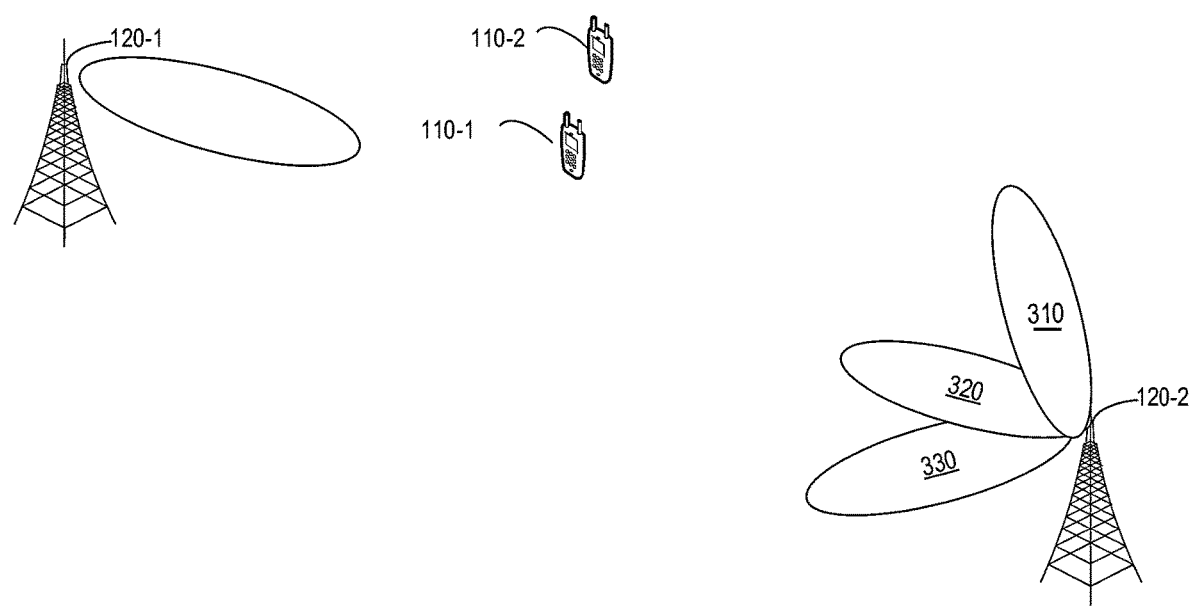
FIG. 3 illustrates a schematic diagram of determining the one or more target transmitting beams according to embodiments of the present disclosure.

FIG. 3 illustrates a schematic diagram of determining the target transmitting beam. The terminal device 110-1 which is the anchor terminal device may perform the measurement on the transmitting beams 310, 320 and 330 of the neighbor network device 120-2. The terminal device 110-1 may determine the transmitting beam 320 to be the one or more target transmitting beams based on the measurement results. In this way, it decreases cost for the terminal device to receive and measure the PRS during DL or DL+UL positioning. The decreased cost could also be utilized by the network to know which PRS beams to transmit in a given PRS occasion.

Figure 4:
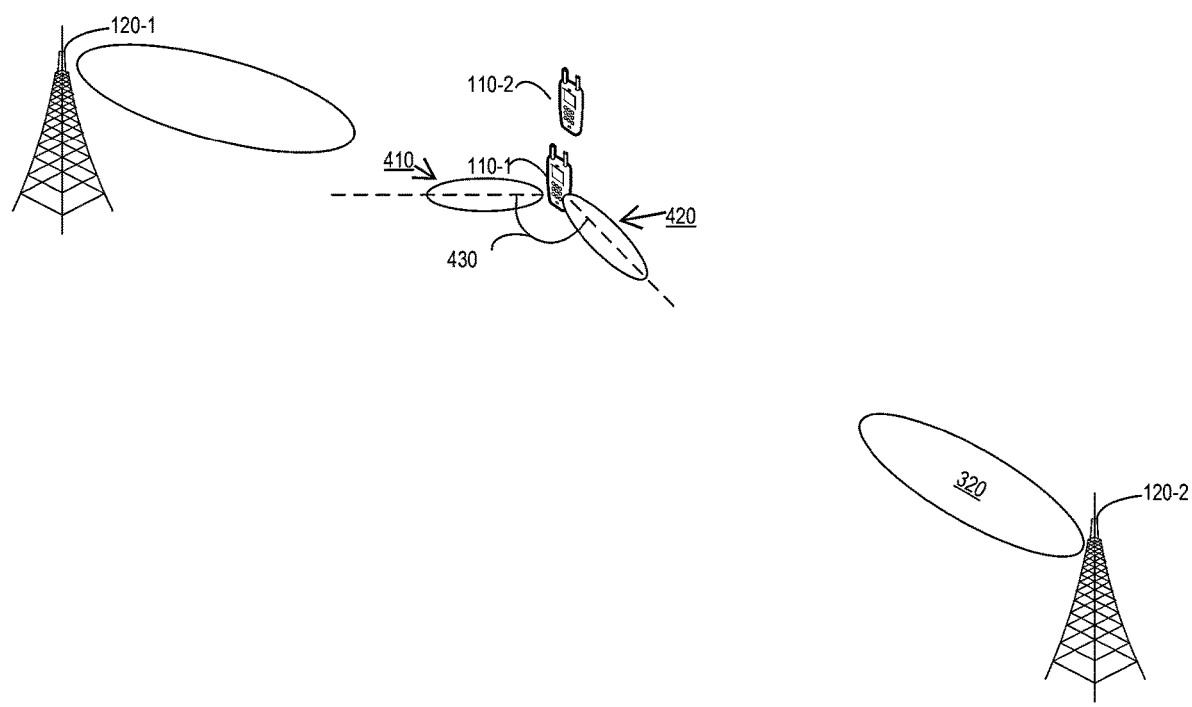
FIG. 4 illustrates a schematic diagram of determining the angle between receiving beams according to embodiments of the present disclosure.

Referring back to FIG. 2, in an example embodiment, the terminal device 110-1 may determine 2015 the angle between one or more best receiving beams for the serving network device 120-1 and one or more best receiving beams for the neighboring network device 120-2. In one embodiment, the terminal device 110-1 may perform receiving beam sweeping to determine the best receiving beams to use for PRS reception. For example, the receiving beam sweeping may be performed over repeated PRS (indicated by the network that the PRS will be repeated). Alternatively or in addition, the receiving beam sweeping may be performed over other configured RS. In one embodiment, the orientation of the terminal device 110-1 may be used to help determine the best receiving beams. FIG. 4 illustrates a schematic diagram of determining the angle between receiving beams according to embodiments of the present disclosure. The terminal device 110-1 may determine the best receiving beam 410 for the serving network device 120-1 and the best receiving beam 420 for the neighboring network device 120-2 through beam sweeping. The terminal device 110-1 may determine the angle 430 between the best receiving beam 410 and the beast receiving beam 420.

Referring back to FIG. 2, the terminal device 110-1 may transmit 2016 the assistance information indicating the one or more target transmitting beams of the neighboring network device 120-2. The assistance information may also comprise the angle 430 between the best receiving beam for the serving network device 120-1 and the best receiving beam for the neighboring network device 120-2. The anchor terminal device may signal the best PRS transmitting beams from the neighboring network device 120-2 and optionally the relative angles between best receiving beams back to the location management device 130. In one embodiment the orientation of the anchor terminal device may also be included in the assistance information signaled to the location management device 130.

In another embodiment, the serving network device 120-1 may transmit 2017 a third request to the terminal device 110-1 to transmit the assistance information to other non-anchor terminal device. The terminal device 110-1 may establish a sidelink with the non-anchor device (for example, the terminal device 110-2) and transmit 2018 the assistance information indicating the target transmitting beam of the neighboring network device and optionally information related to the best receiving beam to use to the terminal device 110-2. The transmission may be in unicast, multicast or broadcast fashion. In another embodiment, the serving network device 120-1 may dedicate sidelink resources for the anchor terminal device to share the assistance information directly with the non-anchor terminal devices. In this way, the terminal devices that are in similar locations to learn the best PRS transmitting beams to measure and optionally the best receiving beams to use. Moreover, it avoids unnecessary transmission of PRS and unnecessary measurement reports, i.e., wastage of radio resources and energy is avoided. Also, the overall latency of positioning can be reduced by reducing the number of measurements.

As mentioned above, the serving network device 120-1 may determine that the terminal device 110-1 to be the non-anchor terminal device in the group. In this situation, the location management device 130 may transmit 2019 the assistance information indicating the target transmitting beam of the neighboring network device and optionally information related to the best receiving beam to use to the terminal device 110-1. For example, the location management device 130 may transmit the assistance information via the LPP protocol. In some embodiments, the location management device 130 may transmit the assistance information to the serving network device 120-1 and the serving network device 120-1 may forward the assistance information to the non-anchor terminal devices.

Assuming the terminal device 110-2 is the anchor terminal device, the location management device 130 may receive the assistance information from the anchor terminal device 110-2 in the group of terminal devices. Alternatively or in addition, the serving network device 120-1 may transmit 2020 the third request to the anchor terminal device 110-2. The anchor terminal device 110-2 may set up a sidelink with the terminal device 110-1 and transmit 2022 the assistance information indicating the target transmitting beam of the neighboring network device and optionally information related to the best receiving beam to use to the terminal device 110-1.

Figure 5:
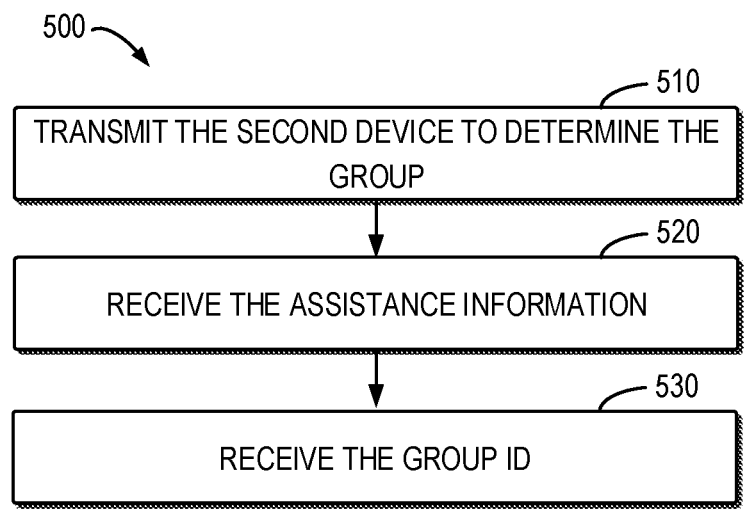
FIG. 5 illustrates a flowchart of a method implemented at a network device according to embodiments of the present disclosure.

FIG. 5 shows a flowchart of an example method 500 implemented at a terminal device in accordance with some embodiments of the present disclosure. The method 500 may be implemented at any suitable devices. For the purpose of discussion, the method 500 will be described from the perspective of the location management device 130 with reference to FIG. 1.

In some embodiments, the location management device 130 receives a first request for downlink positioning to the location management device 130. For example, the terminal device 110-1 may set up a LTE positioning protocol (LPP) secession with the location management device 130. Alternatively or in addition, the request may come from the liferay connected service (LCS) client which may be a number of entities. This client may be internal or external to the network.

At block 510, the location management device 130 transmits a request to the serving network device 120-1 to trigger determining a group of terminal devices to which the terminal device 110-1 belongs based on the network character of the terminal device 110-1. Moreover, terminal devices with the same, common, or similar characteristics may be assigned with the same group identity. In some embodiments, the location management device 130 receives the identity of the group from the serving network device 120-1.

At block 520, the location management device 130 receives the assistance information concerning the one or more target transmitting beams of the neighboring network device 120-2 from the anchor terminal device. The assistance information may also comprise the angle between the one or more best receiving beams for the serving network device 120-1 and the one or more best receiving beam for the neighboring network device 120-2.

In some embodiments, if the terminal device 110-1 is a non-anchor terminal device, the location management device 130 may transmit the assistance information indicating the one or more target transmitting beams of the neighboring network device 120-2. The location management 130 may transmit a request to the anchor terminal device to ask the anchor terminal device to provide the assistance information.

At block 530, the location management device 130 receives and identity of the group of terminal devices from the network device 120-1. The location management device 130 may also receive identity information of the anchor terminal device from the serving network device 120-1.

In some embodiments, if the terminal device 110-1 is an anchor terminal device, the location management device 130 may transmit to the terminal device 110-1 an indication to perform a measurement on a set of transmitting beams of the neighboring network device. The measurement may be used for collecting the assistance information.

Figure 6:
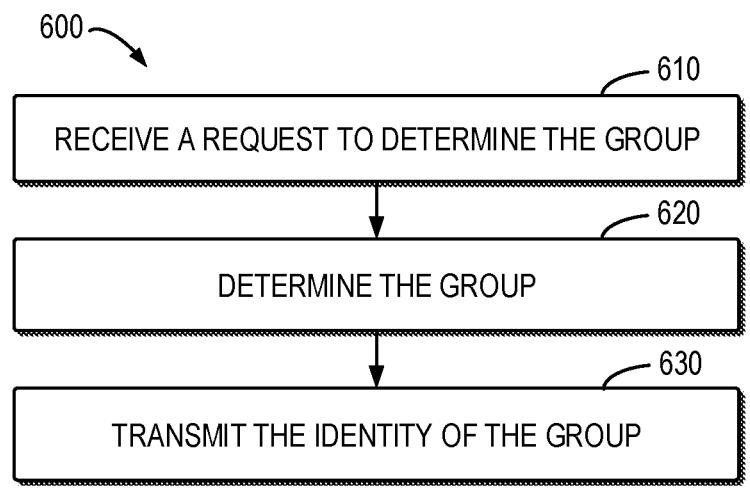
FIG. 6 illustrates a flowchart of a method implemented at a network device according to embodiments of the present disclosure.

FIG. 6 shows a flowchart of an example method 600 implemented at a terminal device in accordance with some embodiments of the present disclosure. The method 600 may be implemented at any suitable devices. For the purpose of discussion, the method 600 will be described from the perspective of the serving network device 120-1 with reference to FIG. 1.

At block 610, the serving network device 120-1 receives from the location management device 130 a second request to trigger determining a group of terminal devices to which the terminal device 110-1 belongs based on the characteristics of the terminal device 110-1.

At block 620, the network device 120-1 determines the group of terminal devices based on the network character of the terminal device 110-1. Moreover, terminal devices with the same, common, or similar characteristics may be assigned with the same group identity. The network device 120-1 may assign an identity to the group of terminal devices.

In an example embodiment, the characteristics for grouping may comprise one or more of: a synchronization signal block (SSB) or a channel state information reference signal CSI-RS index of the serving cell, SSB/CSI-RS index of the serving network device 120-1, timing advance (TA) of the terminal device 110-1, a reference signal received power report (for example, a L3-RSRP report) from at least one of the serving network device and or other network devices, the angle of departure at the serving cell and the angle of arrival at the serving network device 120-1, active sidelink connections of the terminal device 110-1, sensor information of the terminal device 110-1 (for example, speed, direction), or connectivity of the terminal device 110-1 to a small cell or WiFi hotspot. According to one example embodiment, the terminal device groups and group identity may be determined based on one or a combination of these characteristics.

In some embodiments, if the serving network device 120-1 determines that the terminal device 110-1 does not belong to any existing groups based on its characteristics, the serving network device 120-1 may determine that the terminal device 110-1 to be the anchor terminal device of a new group. In other embodiments, if the serving network device 120-1 determines that the terminal device 110-1 belongs to an existing group based on its characteristics, the serving network device 120-1 may determine that the terminal device 110-1 to be the non-anchor terminal device in the group. Alternatively, even if the terminal device 110-1 belongs to an existing group, the serving network device 120-1 may also determine the terminal device 110-1 to be the anchor terminal device in the existing group.

At block 630, the serving network device 120-1 transmits the identity of the group of terminal devices to the location management device 130. As mentioned above, the terminal device 110-1 may be the anchor terminal device in the group of terminal devices. In this situation, the serving network device 120-1 may transmit 2010 an indication to explicit indicate that the terminal device 110-1 is the anchor terminal device. Alternatively, the serving network device 120-1 may transmit 2010 an indication to the terminal device 110-1 to perform the beam measurement, which implicitly indicates the terminal device 110-1 is the anchor terminal device.

As mentioned above, the serving network device 120-1 may determine that the terminal device 110-1 to be the non-anchor terminal device in the group. Assuming the terminal device 110-2 is the anchor terminal device, the serving network device 120-1 may transmit the third request to the anchor terminal device 110-2 to transmit the assistance information indicating the one or more target transmitting beams to the terminal device 110-1.

Figure 7:
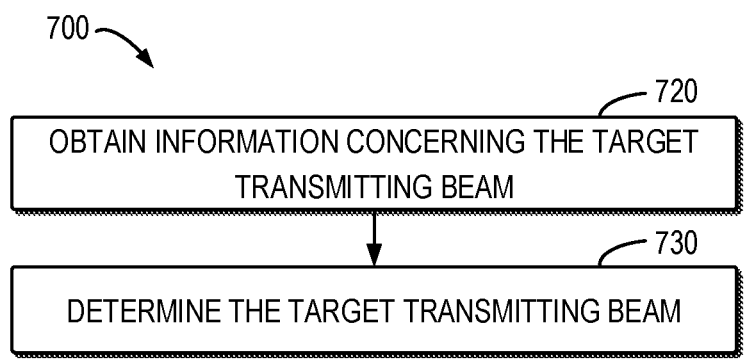
FIG. 7 illustrates a flowchart of a method implemented at a terminal device according to embodiments of the present disclosure.

FIG. 7 shows a flowchart of an example method 700 implemented at a terminal device in accordance with some embodiments of the present disclosure. The method 700 may be implemented at any suitable devices. For the purpose of discussion, the method 700 will be described from the perspective of the terminal device 110-1 with reference to FIG. 1.

In some embodiments, the terminal device 110-1 transmits a first request for downlink positioning to the location management device 130. For example, the terminal device 120-1 may set up a LTE positioning protocol (LPP) secession with the location management device 130.

At block 720, the terminal device 120-1 obtains the assistance information indicating the one or more target transmitting beams of the neighboring network device 120-2. As mentioned above, the terminal device 110-1 may be the anchor terminal device in the group of terminal devices. The terminal device 110-1 may perform the measurement on the transmitting beams from the neighbor network devices 120-2. For example, the location management device 130 and/or the serving network device 120-1 may transmit an indication to the terminal device 110-1 to perform the measurement on the transmitting beams from the neighbor network devices 120-2. This may involve being configured to measure the PRS from either all the beams from neighboring network devices 120-2, or a reasonable sub-set of transmitting beams from neighbor network devices 120-2 depending on the geometric relation. Alternatively or in addition, this may involve being configured to measure other RS from neighboring network device 120-2 such as CSI-RS or SSB and using the best beams for those RS as the basis for determining the best PRS beams.

At block 730, the terminal device 120-1 determines the one or more target transmitting beams based on the information indicating the one or more target transmitting beams. For example, the terminal device 110-1 may determine the one or more target transmitting beams based on the measurement result.

In an example embodiment, the terminal device 110-1 may determine the angle between one or more best receiving beam for the serving network device 120-1 and one or more best receiving beam for the neighboring network device 120-2. The best receiving beam may refer to the beam with highest RSRP. In one embodiment, the terminal device 110-1 may perform receiving beam sweeping to determine the best receiving beams to use for PRS reception. For example, the receiving beam sweeping may be performed over repeated PRS (indicated by the network that the PRS will be repeated). Alternatively or in addition, the receiving beam sweeping may be performed over other configured RS. In one embodiment, the orientation of the terminal device 110-1 may be used to help determine the best receiving beams.

If the terminal device 110-1 is the anchor terminal device, the terminal device 110-1 may transmit the assistance information indicating the one or more target transmitting beams of the neighboring network device 120-2. The assistance information may also comprise the angle between the best receiving beam for the serving network device 120-1 and the best receiving beam for the neighboring network device 120-2. The anchor terminal device may signal the best PRS transmitting beams from the neighboring network device 120-2 and optionally the relative angles between best receiving beams back to the location management device 130. In one embodiment the orientation of the anchor terminal device may also be included in the assistance information signaled to the location management device 130.

In another embodiment, the serving network device 120-1 may transmit a third request to the terminal device 110-1 to transmit the assistance information to other non-anchor terminal device. The terminal device 110-1 may establish a sidelink with the non-anchor device (for example, the terminal device 110-2) and transmit the assistance information to the terminal device 110-2. The transmission may be in unicast, multicast or broadcast fashion.

As mentioned above, the serving network device 120-1 may determine that the terminal device 110-1 to be the non-anchor terminal device in the group. In this situation, the terminal device 110-1 may receive the assistance information the location management device 130. Assuming the terminal device 110-2 is the anchor terminal device, the anchor terminal device 110-2 may set up a sidelink with the terminal device 110-1 and transmit the assistance information to the terminal device 110-1.

In some embodiments, assuming the terminal device 110-1 is the non-anchor terminal device and requires measuring PRS from the neighbor network device 120-2, the serving network device 120-1 can help the terminal device 110-1 steer a receiving beam toward the neighbor network device 120-2 using the information. For example, the assistance information may contain information such as a reference beam indication toward a serving network device 120-1 and angle information between the reference beam and neighbor network device 120-2 direction.

Figure 8:
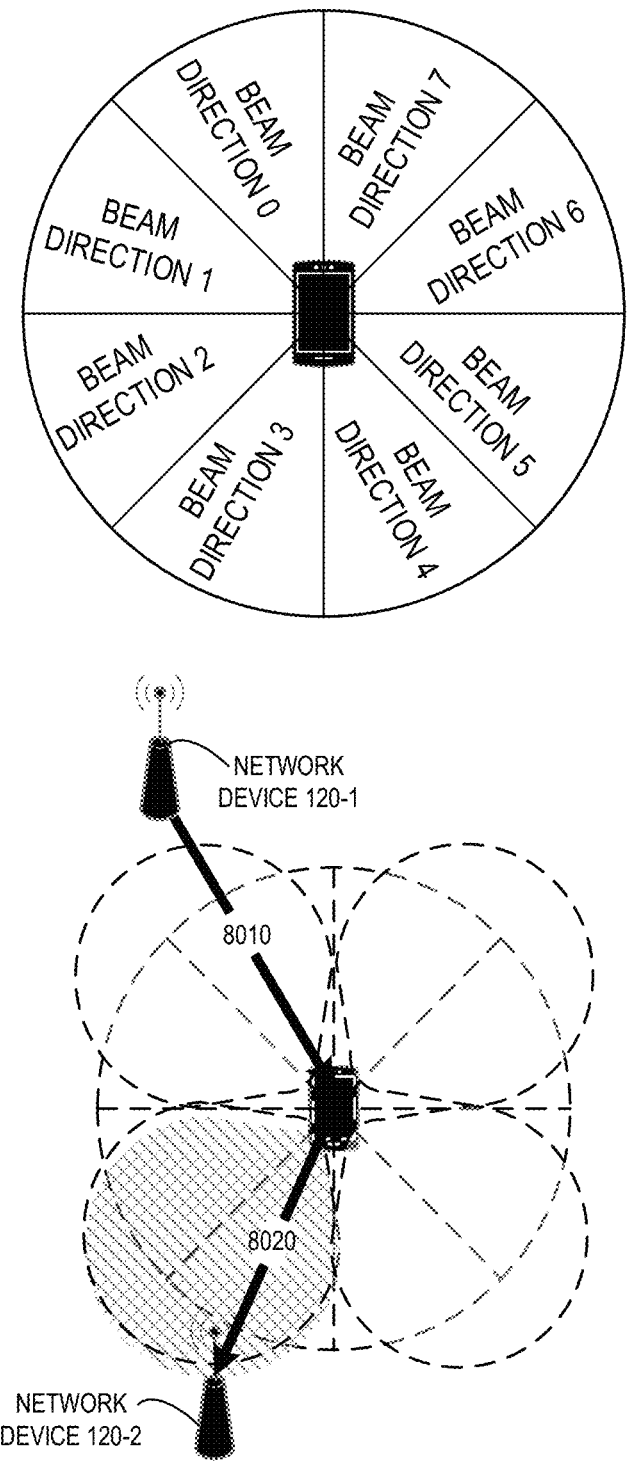
FIG. 8 illustrates schematic diagrams of utilizing the assistance information according to embodiments of the present disclosure.

In some embodiments, the terminal device 110-1 may be configured with transmission configuration indication (TCI) state which is associated with one RS-ID (SSB or CSI-RS) for spatial quasi-colocation relation via radio resource control signaling. There may be 3 bits in DCI to indicate one of the active TCI state indicating a reference beam direction for PRS. From the reference beam, angle information is given for steering to a neighbor cell. FIG. 8 illustrates a schematic diagram of beam angle indication example between a serving network device and a neighbor network device. As shown in FIG. 8, the assistance information can make 8 grids of beam steering directions while the terminal device is equipped with 4-directional receiving beams. The beam 8010 may be the serving network device reference beam indication in the TCI and the direction of the beam 8020 may be obtained from the assistance information.

In some embodiments, an apparatus for performing the method 500 (for example, the location management device 130) may comprise respective means for performing the corresponding steps in the method 500. These means may be implemented in any suitable manners. For example, it can be implemented by circuitry or software modules.

In some embodiments, the apparatus comprises means for transmitting, to a serving network device, a request to determine an identity of a group of terminal devices, the terminal device belonging to the group of terminal devices; means for receiving, from an anchor terminal device in the group, assistance information indicating one or more target transmitting beams of a neighbor network device, the assistance information being associated with the group of terminal devices; and means for receiving an identity of the group of terminal devices from the serving network device.

In some embodiments, the apparatus comprises means for receiving identity information of the anchor terminal device from the serving network device.

In some embodiments, the means for receiving the assistance information comprises: means for in accordance with a determination that the terminal device is an anchor terminal device in the group of terminal device, means for transmitting to the terminal device an indication to perform a measurement on a set of transmitting beams of the neighboring network device, the measurement being used for collecting the assistance information.

In some embodiments, the means for receiving the assistance information comprises: means for in accordance with a determination that the terminal device is an anchor terminal device in the group of terminal device, transmitting a further request to the terminal device to provide the assistance information; and means for receiving the assistance information from the terminal device.

In some embodiments, the apparatus further comprises means for in accordance with a determination that the terminal device is a non-anchor terminal device in the group of terminal device, transmitting the assistance information to the terminal device.

In some embodiments, the assistance information further indicates an angle between one or more receiving beams for the serving network device and one or more optimal receiving beams for the neighboring network device.

In some embodiments, an apparatus for performing the method 600 (for example, the network device 120-1) may comprise respective means for performing the corresponding steps in the method 600. These means may be implemented in any suitable manners. For example, it can be implemented by circuitry or software modules.

In some embodiments, the apparatus comprises means for receiving, at a serving network device and from a location management device, a request to determine a group of terminal devices to which a terminal device belongs; means for determining the group of terminal device based on a network characteristic of the terminal device so that one or more target transmitting beams of a neighbor network device is shared among the group of terminal devices; and means for transmitting an identity of the group of terminal devices to the location management device.

In some embodiments, the apparatus further comprises means for transmitting an identity of the group of terminal devices to the location management device.

In some embodiments, the network characteristic of the terminal device comprises at least one of: a synchronization signal block or a channel state information reference signal index of the serving network device, a timing advance of the serving network device, a reference signal received power report derived from a reference signal from at least one of the serving network device or other network devices, an angle of arrival at the serving network device, a multi-cell round trip time, RTT, measurement, or active sidelink connections of the terminal device.

In some embodiments, the apparatus further comprises means for determining whether the terminal device is an anchor terminal device in the group of terminal devices; means for in accordance with a determination that the terminal device is the anchor terminal device, transmitting, to the terminal device, an indication to perform a reference signal time difference, RSTD, measurement on a set of transmitting beams of the neighboring network device; or means for in accordance with a determination that the terminal device is a non-anchor terminal device, transmitting, to the anchor terminal device, a request to transmit the assistance information to the terminal device via a sidelink.

In some embodiments, an apparatus for performing the method 700 (for example, the terminal device 110-1) may comprise respective means for performing the corresponding steps in the method 700. These means may be implemented in any suitable manners. For example, it can be implemented by circuitry or software modules.

In some embodiments, the apparatus comprises means for obtaining assistance information indicating one or more target transmitting beams towards a neighbor network device, the assistance information being associated with a group of terminal devices to which the terminal device belongs, the group of terminal devices determined in response to the request for downlink positioning; and means for determining, based on the information, the one or more target transmitting beams to facilitate the downlink positioning.

In some embodiments, the terminal device is a non-anchor terminal device and the means for obtaining the assistance information comprises: means for receiving the assistance information from the location management device.

In some embodiments, the terminal device is a non-anchor terminal device and the means for obtaining the assistance information comprises: means for receiving a request from an anchor terminal device in the group of terminal devices to establish a sidelink with the anchor terminal device; and means for receiving the assistance information from the anchor terminal device via the sidelink.

In some embodiments, the terminal device is an anchor terminal device in the group of terminal device, and the means for determining the one or more target transmitting beams comprises: means for, receiving an indication to perform a measurement on a set of transmitting beams of the neighboring network device; and means for determining the one or more target transmitting beams based on a result of the measurement.

In some embodiments, the apparatus further comprises means for determining one or more optimal receiving beams for the serving network device through the beam sweeping; means for determining one or more optimal receiving beams for the neighboring network device through the beam sweeping; means for determining an angle between the one or more optimal receiving beams for the serving network device and the one or more optimal receiving beams for the neighboring network device; and means for adding the angle to the information.

In some embodiments, the apparatus further comprises means for transmitting, to the location management device, the assistance information indicating the target transmitting beam.

In some embodiments, the apparatus further comprises means for receiving, from the serving network device, a request to transmit the assistance information to a non-anchor terminal device; means for establishing a sidelink with the non-anchor terminal device; and means for transmitting the assistance information via the sidelink.

In some embodiments, the assistance information further indicates at least one of: an angle between one or more optimal receiving beams for the serving network device and one or more optimal receiving beams for the neighboring network device, or an identity of the group of terminal devices.

Figure 9:
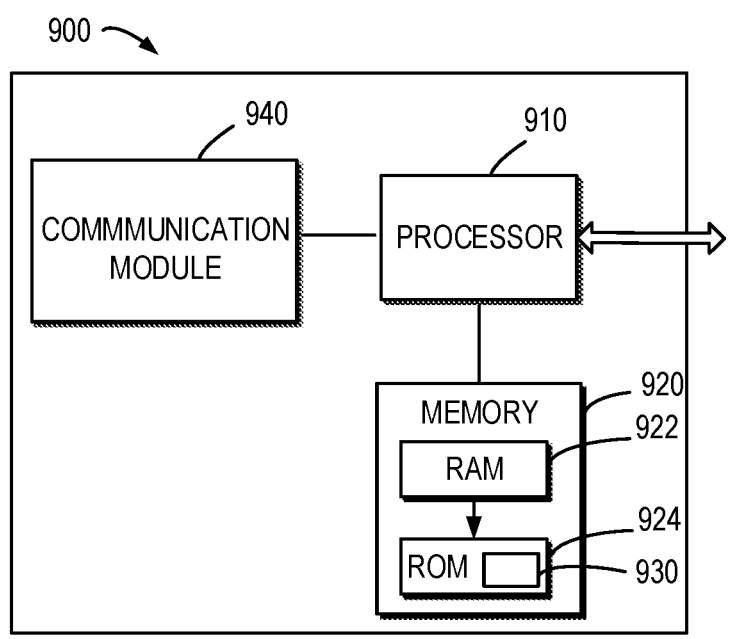
FIG. 9 illustrates a simplified block diagram of a device that is suitable for implementing embodiments of the present disclosure.

FIG. 9 is a simplified block diagram of a device 900 that is suitable for implementing embodiments of the present disclosure. The device 900 may be provided to implement the communication device, for example the network device 120, the location management device 130 or the terminal device 110-1 as shown in FIG. 1. As shown, the device 900 includes one or more processors 910, one or more memories 920 coupled to the processor 910, and one or more communication module (for example, transmitters and/or receivers (TX/RX)) 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 2 to 8. The embodiments of the present disclosure may also be implemented by hardware or by a combination of software and hardware.

Figure 10:
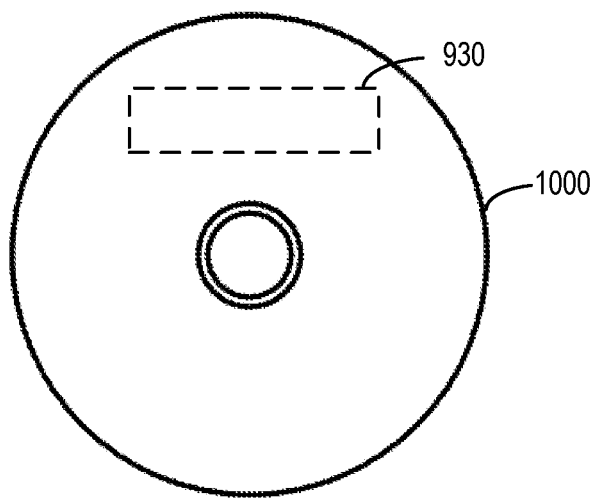
FIG. 10 illustrates a block diagram of an example computer readable medium in accordance with some embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500-700 and interactions as described above with reference to FIGS. 2-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
   at least one processor; and
   at least one non-transitory memory including computer program codes;
   the at least one memory and the computer program codes are configured to, with the at least one processor, cause the terminal device to:
   obtain assistance information indicating one or more target transmitting beams towards a neighbor network device, the assistance information being associated with a group of terminal devices to which the terminal device belongs, the group of terminal devices determined in response to a request for downlink positioning; and
   determine, based on the information, the one or more target transmitting beams to facilitate downlink positioning,
   wherein the terminal device is an anchor terminal device in the group of terminal devices, and wherein the terminal device is caused to determine the one or more target transmitting beams with:
   receiving an indication to perform a measurement on a set of transmitting beams of the neighboring network device; and
   determining the one or more target transmitting beams based on a result of the measurement.

2. The terminal device of claim 1, wherein the at least one memory and the computer program codes are configured to, with the at least one processor, cause the terminal device to:
   determine one or more optimal receiving beams for a serving network device through a beam sweeping;
   determine one or more optimal receiving beams for the neighboring network device through the beam sweeping;
   determine an angle between the one or more optimal receiving beams for the serving network device and the one or more optimal receiving beams for the neighboring network device; and
   add the angle to the assistance information.

3. The terminal device of claim 1, wherein the at least one memory and the computer program codes are configured to, with the at least one processor, cause the terminal device to:
   transmit, to the location management device, the assistance information indicating the one or more target transmitting beams.

4. The terminal device of claim 1, wherein the at least one memory and the computer program codes are configured to, with the at least one processor, cause the terminal device to:
   receive, from a serving network device, a request to transmit the assistance information to a non-anchor terminal device;
   establish a sidelink with the non-anchor terminal device; and
   transmit the assistance information via the sidelink.

5. The terminal device of claim 1, wherein the assistance information indicates:
   an angle between one or more optimal receiving beams for a serving network device and one or more optimal receiving beams for the neighboring network device, and
   an identity of the group of terminal devices.

6. A method in a terminal device, comprising:
   obtaining assistance information indicating one or more target transmitting beams towards a neighbor network device, the assistance information being associated with a group of terminal devices to which the terminal device belongs, the group of terminal devices determined in response to a request for downlink positioning; and
   determining, based on the information, the one or more target transmitting beams to facilitate downlink positioning,
   wherein the terminal device is an anchor terminal device in the group of terminal devices, and wherein the terminal device determines the one or more target transmitting beams with:
   receiving an indication to perform a measurement on a set of transmitting beams of the neighboring network device; and
   determining the one or more target transmitting beams based on a result of the measurement.

7. The method of claim 6, further comprising:
   determining one or more optimal receiving beams for a serving network device through a beam sweeping;
   determining one or more optimal receiving beams for the neighboring network device through the beam sweeping;
   determining an angle between the one or more optimal receiving beams for the serving network device and the one or more optimal receiving beams for the neighboring network device; and
   adding the angle to the assistance information.

8. The method of claim 6, further comprising:
   transmitting, to the location management device, the assistance information indicating the one or more target transmitting beams.

9. The method of claim 6, further comprising:
   receiving, from a serving network device, a request to transmit the assistance information to a non-anchor terminal device;
   establishing a sidelink with the non-anchor terminal device; and
   transmitting the assistance information via the sidelink.

10. The method of claim 6, wherein the assistance information indicates:
    an angle between one or more optimal receiving beams for a serving network device and one or more optimal receiving beams for the neighboring network device, and
    an identity of the group of terminal devices.

* * * * *